US011707868B2

(12) United States Patent
Aldigeri

(10) Patent No.: US 11,707,868 B2
(45) Date of Patent: Jul. 25, 2023

(54) METHOD AND AN APPARATUS FOR MOVING OBJECTS AWAY FROM A MOULD

(71) Applicant: SACMI COOPERATIVA MECCANICI IMOLA SOCIETA' COOPERATIVA, Imola (IT)

(72) Inventor: Gianluca Aldigeri, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 106 days.

(21) Appl. No.: 17/070,639

(22) Filed: Oct. 14, 2020

(65) Prior Publication Data

US 2021/0114265 A1    Apr. 22, 2021

(30) Foreign Application Priority Data

Oct. 16, 2019  (IT) .......................... 102019000019004

(51) Int. Cl.
*B29C 43/50*  (2006.01)

(52) U.S. Cl.
CPC ...... *B29C 43/50* (2013.01); *B29C 2043/5084* (2013.01)

(58) Field of Classification Search
CPC ............... B65G 47/847; B65G 47/846; B29C 2043/5069
See application file for complete search history.

(56) References Cited

U.S. PATENT DOCUMENTS

| 7,946,839 | B2 | 5/2011 | Zanoni |
| 8,794,954 | B2* | 8/2014 | Aldigeri ............. B29C 37/0007 425/297 |
| 2006/0121149 | A1 | 6/2006 | Zanoni |
| 2012/0171319 | A1 | 7/2012 | Aldigeri |
| 2012/0201920 | A1 | 8/2012 | Aldigeri et al. |

FOREIGN PATENT DOCUMENTS

WO        2004096515        11/2004

* cited by examiner

*Primary Examiner* — Galen H Hauth
(74) *Attorney, Agent, or Firm* — Pearne & Gordon LLP; J. Gregory Chrisman

(57) ABSTRACT

A method for conveying a concave object having a lateral wall away from a mould comprises the steps of:
  providing a removing element, movable along a path, and a guiding element;
  extracting the object from the mould and releasing the object onto a supporting surface in a position interposed between the removing element and the guiding element, while the removing element is at a distance from the object;
  displacing the removing element towards the object, so that the removing element makes contact with the lateral wall;
  moving the removing element along a portion of the path, to convey the object towards a delivery position.

20 Claims, 8 Drawing Sheets

METHOD AND AN APPARATUS FOR MOVING OBJECTS AWAY FROM A MOULD

The invention relates to a method and an apparatus for moving objects away from a mould, for example from a mould included in a compression moulding device, intended to form objects by shaping doses of polymeric material. The moulding device may be, for example, shaped like a moulding carousel.

More specifically, the method and the apparatus according to the invention allow the objects, which have been produced in the mould, to be transported, by moving these objects away from the mould, for example to deliver the objects to an outfeed conveyor.

The method and the apparatus according to the invention are particularly suitable for conveying objects which have a projecting edge zone, for example shaped like a flange, and/or objects delimited by flared lateral walls, which, that is, lateral walls which widen progressively towards an opening of the object. Examples of these objects are capsules intended to contain a substance in powder or granular form, such as coffee or the like, arranged for preparing beverages or other food fluids, or certain types of preforms intended to be subjected to a blow moulding or stretch-blow moulding process to form containers, or containers such as cups, jars or bowls.

However, the method and the apparatus according to the invention can also be used for conveying other types of objects, such as, for example, caps.

Apparatuses are known which serve for producing objects by compression moulding dosed quantities of polymeric material. The prior art apparatuses comprise a plurality of moulds, each of which includes a male part having a punch and a female part having a cavity. The moulds are positioned in a peripheral region of a moulding carousel, rotatable about a vertical axis. The prior art apparatuses also comprise a removing carousel, provided with a plurality of removing elements each of which is suitable for receiving an object that has just been formed and extracted from the mould, in order to convey the object far from the moulding carousel and deliver it, for example, to an outfeed conveyor.

Each removing element may have a C-shaped conveying portion, having a seat in which the object to be conveyed can be received, and two lateral projections which delimit the seat. A fixed guide is further provided, the fixed guide operating in conjunction with the removing elements to keep the object guided during transport towards the outfeed conveyor. In particular, whilst it is conveyed towards the outfeed conveyor, each object is, in a lateral region thereof, in contact with the removing element. Each object is furthermore in contact with the guide, in a further lateral region of the object diametrically opposite the lateral region mentioned above.

The objects are usually delivered to the removing elements from the top downwards, since these objects are detached from a part of the mould in contact with which they have been formed, said part of the mould being positioned above a supporting disc of the removing device. The objects are then released on the supporting disc. The objects are in this way inserted between the conveying portion of the removing element and the fixed guide, to be then transported towards the outfeed conveyor.

A removal carousel of the type described above provides excellent performance when the objects to be conveyed are delimited by a substantially cylindrical lateral surface, as occurs in the case of caps. However, when the objects to be conveyed have a projecting edge zone which projects from a lateral wall of the object, for example shaped like a flange, or when the objects to be conveyed have a frustoconical lateral wall or more generally a lateral wall which widens towards an end, as occurs in the case of capsules for coffee or similar products, a mechanical interference may occur between the object to be conveyed and the removing element and/or between the object to be conveyed and the fixed guide. This may cause drawbacks due to the fact that the object can be positioned incorrectly on the removing device, which makes it impossible to correctly transport the object and, in the worst cases, may even lead to a jam which causes the apparatus to stop.

Examples of prior art apparatuses are disclosed in US 2012/171319 and in US 2012/201920.

An object of the invention is to improve the methods and the apparatuses for conveying objects, particularly objects produced by compression moulding, which have to be moved away from a moulding device.

A further object is to provide a method and an apparatus for moving an object away from a mould, in which the risks of the object being positioned incorrectly when it is released from the mould are reduced.

Another object is to provide a method and an apparatus which can be successfully used to move away from a mould even objects having a projecting edge zone, for example shaped like a flange.

Another object is to provide a method and an apparatus which can be successfully used to move away from a mould even objects having a lateral wall which widens progressively towards an end of the object, for example a frustoconical lateral wall.

In a first aspect of the invention, there is a provided a method for conveying a concave object having a lateral wall away from a mould, the method comprising the steps of:
  providing a removing element, movable along a path, and a guiding element;
  extracting the object from the mould releasing the object on a supporting surface in a position interposed between the removing element and the guiding element, while the removing element is spaced from the object;
  displacing the removing element towards the object, so that the removing element comes into contact with the lateral wall;
  moving the removing element along a portion of said path, to convey the object towards a delivery position.

Owing to the first aspect of the invention, it is possible to convey the object extracted from the mould towards delivery position without unwanted interference between the object and the removing element and/or between the object and the guiding element. That interference might prevent the object from being correctly positioned between the removing element and the guiding element, thereby making it difficult to convey the object towards the delivery position. When the object is positioned between the removing element and the guiding element, the removing element is indeed in a more retracted position if compared with the prior art, at such a distance from the guiding element that there is a clearance between the removing element and the object and/or between the object and the guiding element. The object can thus be positioned between the removing element and the guiding element without interfering with the removing element and/or with the guiding element. This reduces the risk of the object being positioned incorrectly between the removing element and the guiding element.

In an embodiment, during the step of extracting the object from the mould, an extracting element brings the object into contact with the supporting surface by making the object pass between the removing element and the guiding element.

The extracting element, in addition to removing the object from the mould, accompanies the object whilst the latter is moved away from the mould, until the moment the object comes into contact with the supporting surface. The extracting element thus controls the position of the object whilst the object is moved towards the supporting surface, thereby preventing the object from falling freely on the supporting surface, which could adversely affect the precision in positioning the object on the supporting surface.

In an embodiment, the removing element retains the object while the extracting element moves away from the supporting surface.

The removing element, in addition to conveying the object towards the delivery position, therefore performs a further function, that is to say, helping the object to detach correctly from the extracting element.

In an embodiment, the object comprises a projecting edge zone which projects outward from one end of the lateral wall.

During the step of displacing the removing element towards the object, a portion of the projecting edge zone is received in a recessed zone provided in the removing element.

In this way, the removing element can abut against the lateral wall of the object, without interfering with the projecting edge zone. This allows the object to be centred relative to the removing element by using the lateral wall of the object, which makes it possible to increase the precision in positioning the object.

In an embodiment, the removing element retains the object by acting on the projecting edge zone to prevent the object from moving away from the supporting surface.

This is an effective way to ensure that the object detaches from the extracting element.

In an embodiment, the lateral wall of the object comes into contact with the guiding element, so that the object is kept guided between the removing element and the guiding element while it is conveyed towards the delivery position.

This prevents undesired movements of the object.

In an embodiment, a part of the projecting edge zone is received in an indentation provided in the guiding element.

This may further help to detach the object from the extracting element.

In a second aspect of the invention, there is provided an apparatus comprising:
  at least one mould for forming an object;
  at least one removing element, movable along a path, for moving the object away from the mould;
  a guiding element intended to operate in conjunction with the removing element to keep the object guided while the object is moved away from the mould;
  a positioning device for positioning the removing element at a distance from the guiding element which is variable along said path, the positioning device being so configured that the removing element is at a distance from the object, when the object is received between the removing element and the guiding element, the positioning device being further configured to move the removing element towards the guiding element, so as to bring the removing element into contact with a lateral wall of the object.

The apparatus according to the second aspect of the invention makes it possible to obtain the advantages described above with reference to the method according to the first aspect of the invention.

The invention can be better understood and implemented with reference to the accompanying drawings which illustrate some non-limiting example embodiments of it and in which:

FIG. 1 shows an apparatus 1 for producing objects made of polymeric material by compression moulding.

Figure 5:
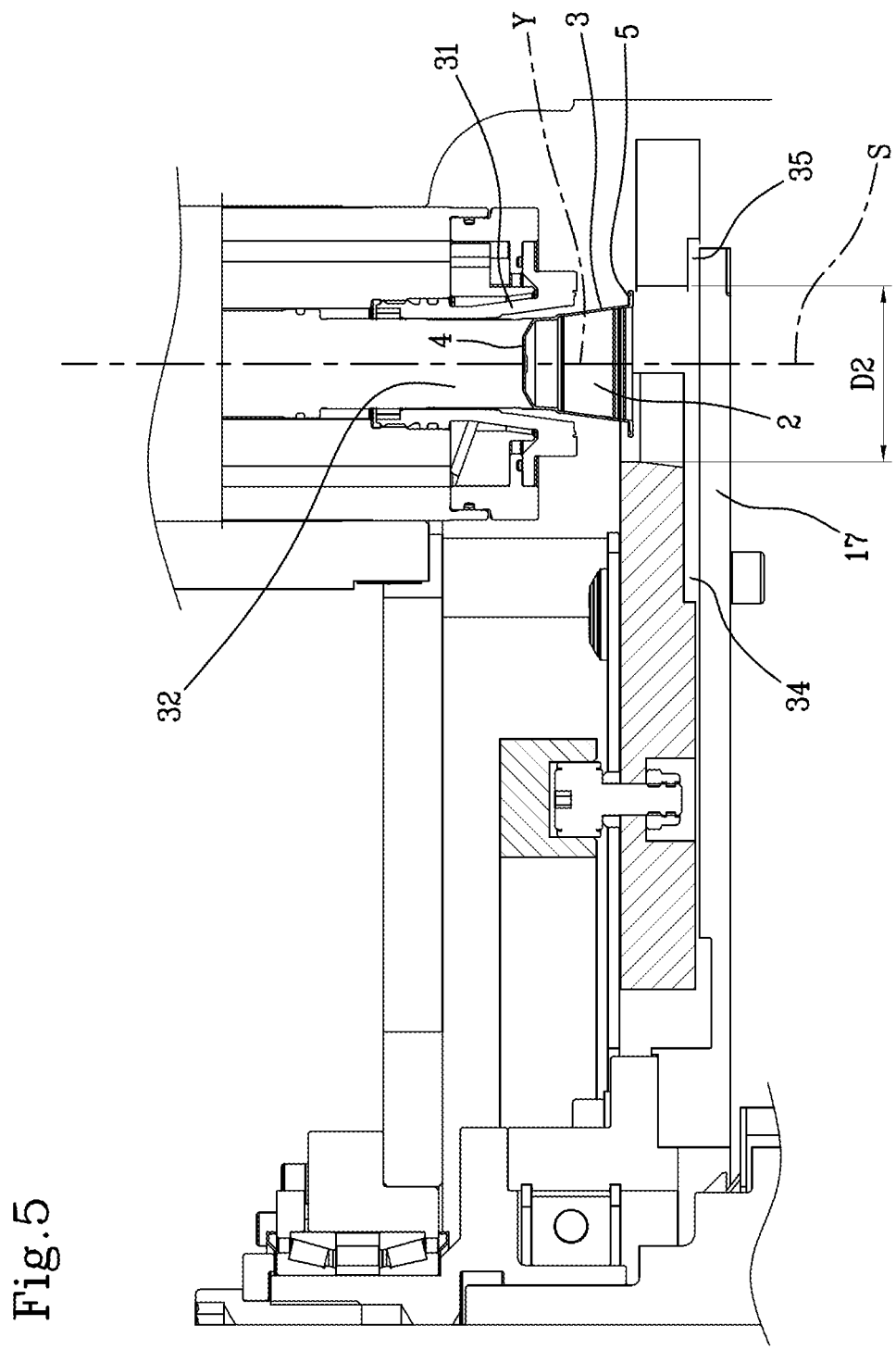
FIG. 5 is a view like that of FIG. 4, relating to a position subsequent to that of FIG. 4, in which the object is about to be released on a supporting surface of the removing device.

In the example shown, the apparatus 1 is configured for making objects 2 shaped like capsules for coffee or for other substances, either in granular or powder form, containing ingredients intended to be extracted by means of a fluid. As shown in FIG. 5, the objects 2 have a lateral wall 3, which extends about an axis Y, and a transversal wall 4, which extends transversally, in particular perpendicularly, to the axis Y. Each object 2 further comprises a projecting edge zone 5, which projects outward at an end of the lateral wall 3. The projecting edge zone 5 may be shaped like a flange, to which a sealing film may be applied, for example by gluing or sealing.

The transversal wall 4 is positioned at a further end of the lateral wall 3, opposite the end having the projecting edge zone 5, so as to close the further end. The lateral wall 3 may be frustoconical and have a transversal dimension, for example a diameter, which increases from the transversal wall 4 towards the projecting edge zone 5.

The apparatus 1 may also be used for producing objects different from the capsules shown in the drawings, but equally having a projecting edge zone, such as containers such as, for example, jars, cups or bowls, or certain types of preforms. Alternatively, the apparatus 1 may be used for producing other objects, in particular concave objects, such as, for example, caps.

Figure 2:
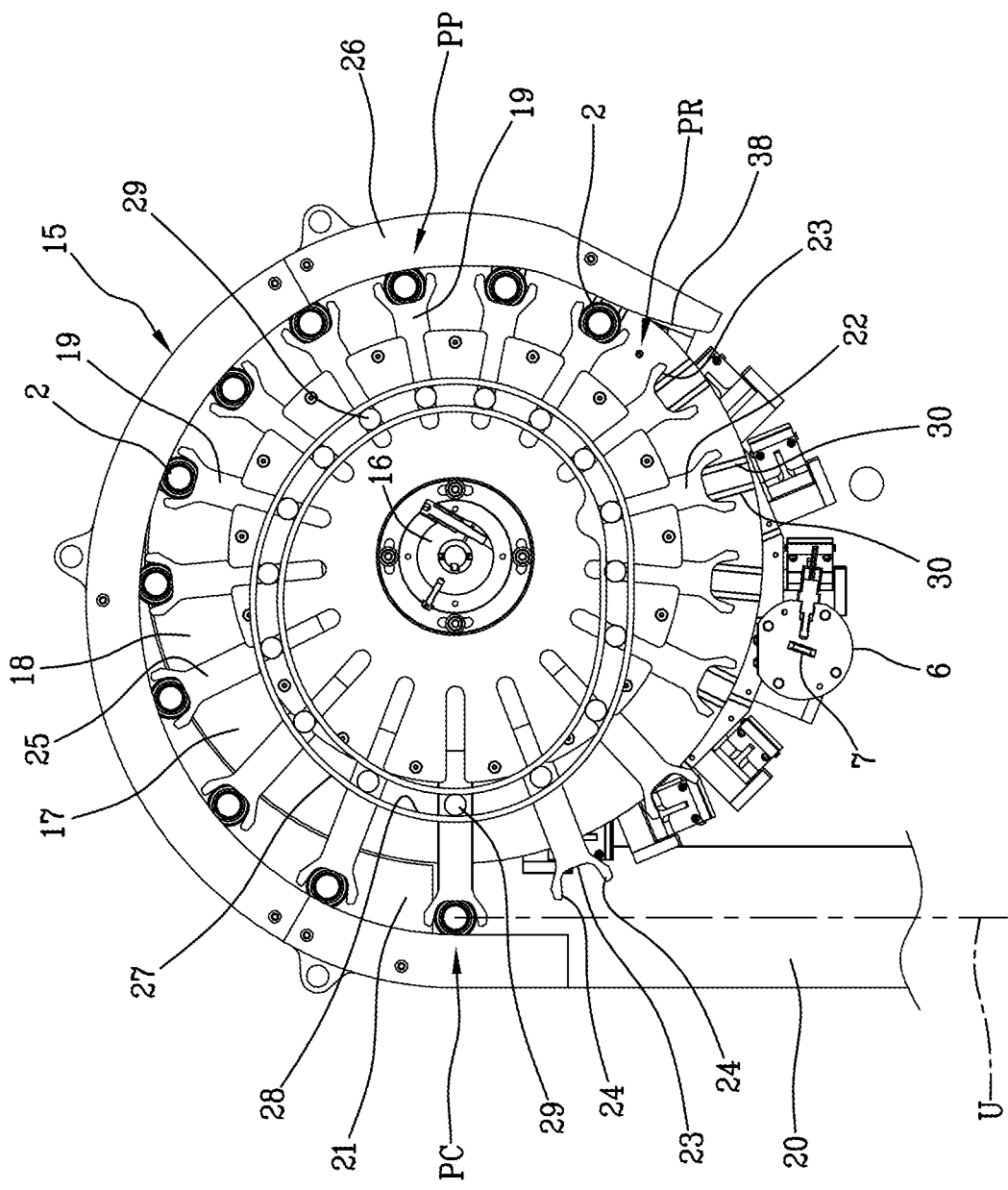
FIG. 2 is an enlarged plan view showing a removing device of the apparatus of FIG. 1.

The apparatus 1 comprises a dispensing device 6, shown in FIG. 2, for dispensing at least one polymeric material. The dispensing device 6 can comprise a co-extrusion device for dispensing a continuous extrudate comprising a plurality of layers of polymeric materials different to each other. Alternatively, the dispensing device 6 may comprise an extrusion device arranged for extruding a continuous single-material extrudate, that is to say, an extrudate made of a single polymeric material instead of a plurality of polymeric materials different to each other.

As shown in FIG. 2, the dispensing device 2 can have an outlet opening 7 having a rectangular or square shape, so as to dispense a continuous extrudate shaped like a strip having a cross-section which is rectangular or square. If the cross-section of the strip is rectangular, the base of the rectangle may be much greater than the height thereof, even if this condition is not necessary.

Figure 1:
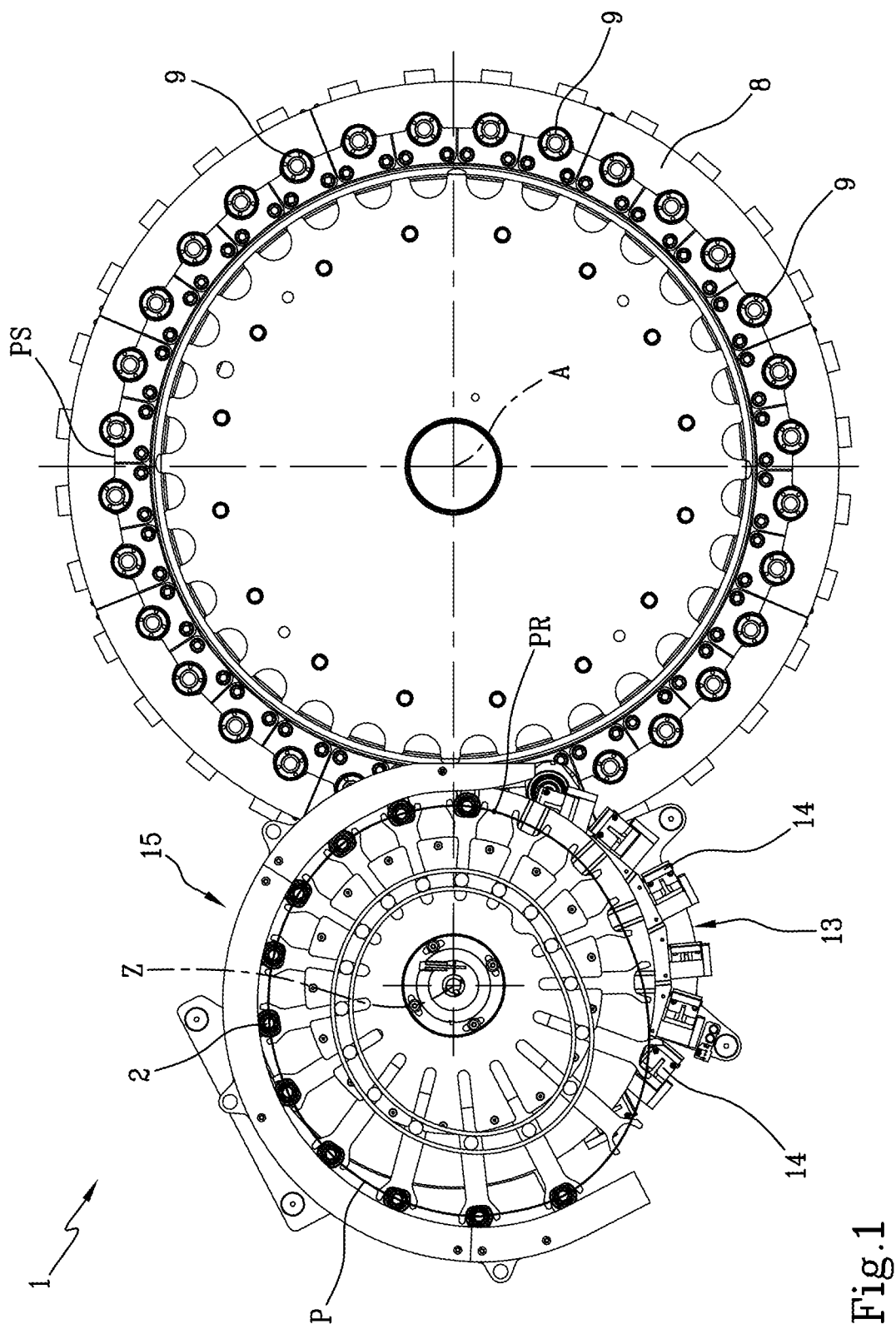
FIG. 1 is a plan view of an apparatus for producing objects by compression moulding.

The apparatus 1 further comprises a moulding device, which, in the example shown, is shaped like a moulding carousel 8, shown in FIG. 1.

The moulding carousel 8 is rotatable about a respective axis which, in the example illustrated, is positioned vertically. The moulding carousel 8 is provided, in a peripheral region thereof, with a plurality of moulds 9 each of which is configured for shaping a dose of polymeric material, obtained by cutting the continuous extrudate coming out from the dispensing device 6, in such a way as to obtain an object 2 by compression moulding. The moulds 9 are distributed, for example in an angularly equidistant manner, along the entire periphery of the moulding carousel 8.

As shown in FIG. 1, the moulds 9 move along a trajectory PS, which in the example shown is shaped like a closed path, for example a circular path centred on the axis A.

Figure 8:
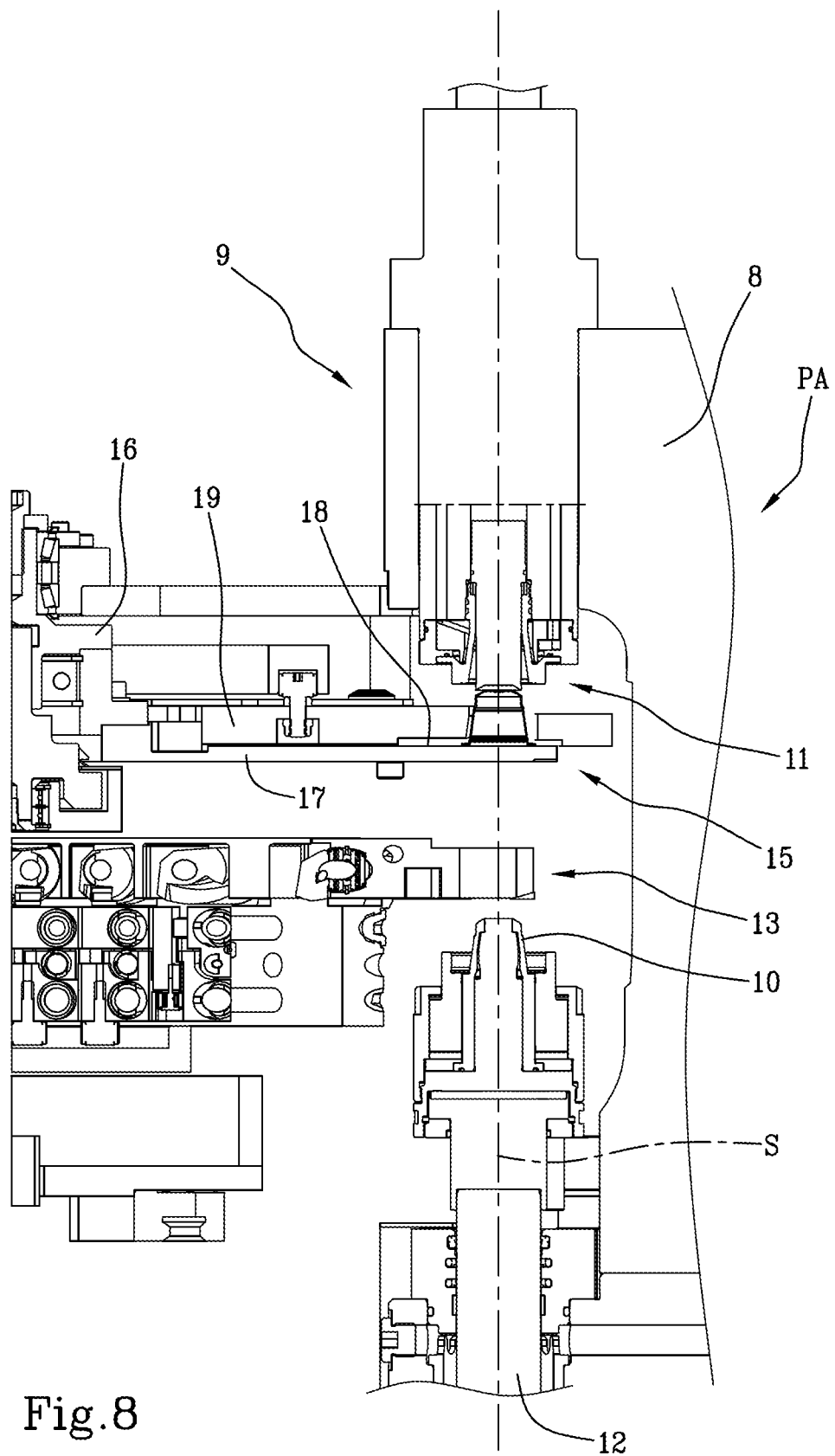
FIG. 8 is a schematic cross-section showing a portion of the apparatus of FIG. 1, in the position shown in FIG. 6.

As shown in FIG. 8, each mould 9 comprises a male part 10 and a female part 11, aligned with each other along a moulding axis S which in the example shown is vertical. In the example shown, the male part 10 is positioned below the female part 11, but this condition is not necessary.

Other reciprocal arrangements of the male part 10 and of the female part 11 are possible.

The male part 10 and the female part 11 of each mould 9 are movable relative to each other between a position of maximum opening PA, shown in FIG. 8, and a forming position not illustrated. In the position of maximum opening PA, the male part 10 and the female part 11 are spaced apart from each other and are at a mutual distance which is at a maximum. In the forming position, the male part 10 and the female part 11 are close to each other, in such a way that between the male part 10 and the female part 11 it is possible to define a forming chamber having a shape corresponding to the shape of the object 2 to be formed.

The apparatus 1 comprises a driving device for moving the male part 10 and the female part 11 between the position of maximum opening PA and the forming position. In the example shown, the driving device is associated with the male part 10, which is moved along the corresponding moulding axis S while the female part 11 remains in a fixed position along the moulding axis S. In an alternative embodiment, however, it is possible to move only the female part 11 along the moulding axis S, or move both the female part 11 and the male part 10 along the moulding axis S.

The driving device may be, for example, hydraulic, or mechanical, such as a cam. The driving device comprises a rod 12, shown in FIG. 8, at an upper end of which the male part 10 is positioned.

A transport device 13 is positioned between the dispensing device 2 and the moulding carousel 8. The transport device 13, which is partially visible in FIG. 1, is shaped like a transport carousel in the example shown. The transport device 13 comprises a plurality of transport elements 14 each of which is arranged for transporting, towards the moulding carousel 8, a dose of polymeric material which has been separated from the polymeric material coming out from the dispensing device 6.

The apparatus 1 further comprises a removing device 15, configured to move away from the moulds 9 the objects 2 which have just been formed by compression moulding the doses.

As shown in FIGS. 2 and 8, the removing device 15 comprises a central body 16 rotatable about an axis Z, shown in FIG. 1, which in the example shown is vertical. The axis Z may be parallel to the axis A of the moulding carousel 8.

The removing device 15 further comprises a supporting disc 17, fixed relative to the central body 16. The supporting disc 17 is thus rotatable about the axis Z together with the central body 16. The supporting disc 17 is delimited by a supporting surface 18, suitable for restingly receive the objects 2 which have to be moved away from the moulding carousel 8.

The removing device 15 further comprises a plurality of removing elements 19, each of which is suitable for collecting an object 2 extracted from the corresponding mould 9 and conveying the object 2 away from the moulding carousel 8. In particular, an outfeed conveyor 20 may be provided, for example shaped like a belt conveyor, the outfeed conveyor 20 being positioned downstream of the removing device 15 for receiving from the removing elements 19 corresponding objects 2 and moving the objects 2 away from the apparatus 1. The outfeed conveyor 20, which is shown schematically in FIG. 2, may extend along a respective outfeed axis U.

An intermediate support 21 is provided between the removing device 15 and the outfeed conveyor 20, the intermediate support 21 being shown schematically in FIG. 2. The intermediate support 21 is suitable for temporarily supporting the objects 2 while the removing elements 19 displace the objects 2, previously rested on the supporting disc 17, towards the outfeed conveyor 20.

Each removing element 19 comprises a conveying portion 22 suitable for engaging with an object 2 for conveying the object from the mould 9 towards the outfeed conveyor 20. The conveying portion 22, which may be C-shaped, has a seat 23 in which an object 2 can be received. The seat 23 is delimited by two lateral protrusions 24.

Each removing element 19 further comprises an elongate portion 25, which projects from the conveying portion 22 towards the axis Z. The elongate portions 25 may be arranged substantially radially relative to the axis Z.

Figure 4:
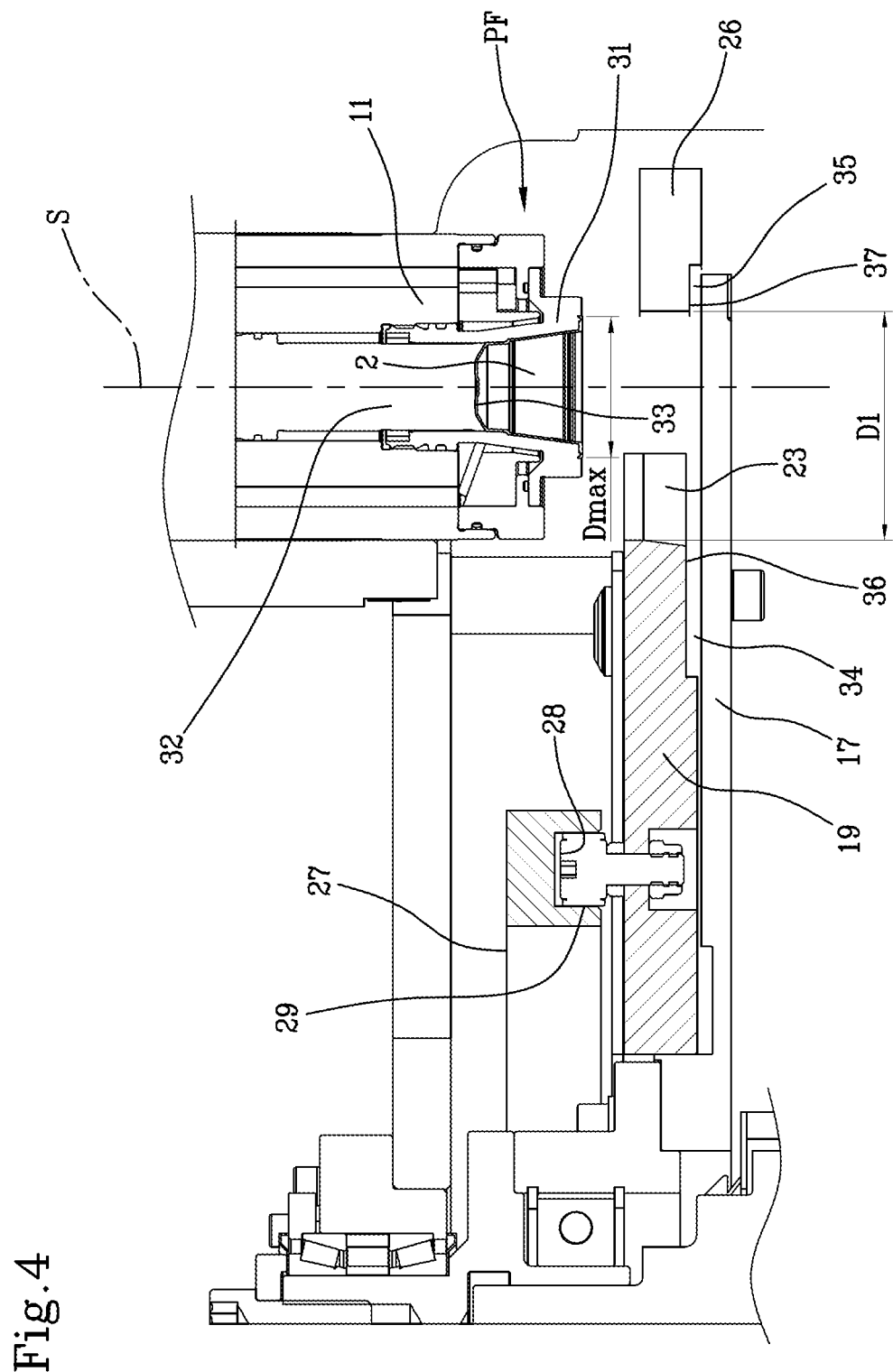
FIG. 4 is an enlarged cross section showing a detail of the apparatus of FIG. 1, in a position in which an object is extracted from a mould.

The removing elements 19 are positioned above the supporting disc 17. As shown in FIG. 4, the removing elements 19 are spaced from the supporting disc 17, at least near the respective conveying portion 22.

The apparatus 1 further comprises a guiding element 26 suitable for interacting with the objects 2, in particular with the lateral wall 3 of the objects 2, in such a way as to guide the objects 2 while the latter are conveyed towards the outfeed conveyor 20 by the removing elements 19.

The guiding element 26, which may have an arched shape, is positioned outside the conveying portions 22, that is to say, it is located in a position furthest from the axis Z relative to the conveying portions 22.

The guiding element 26 is mounted in a fixed position on the apparatus 1.

The removing device 15 further comprises a positioning device for positioning the removing elements 19 at a variable distance from the axis Z, depending on the angular position of the removing elements 19 about the axis Z. The positioning device may comprise a cam element 27, for example arranged in a fixed position on the apparatus 1. In the example shown, the cam element 27 is positioned above the supporting disc 17 and the removing elements 19. The cam element 27 has a cam track 28, which extends along a central line LC, shown in FIG. 3. The central line LC is a closed-loop line, which extends about the axis Z. The points of the central line LC are at different distances from the axis Z.

The central line LC lies on a plane positioned transversally, in particular perpendicularly, to the axis Z.

Figure 3:
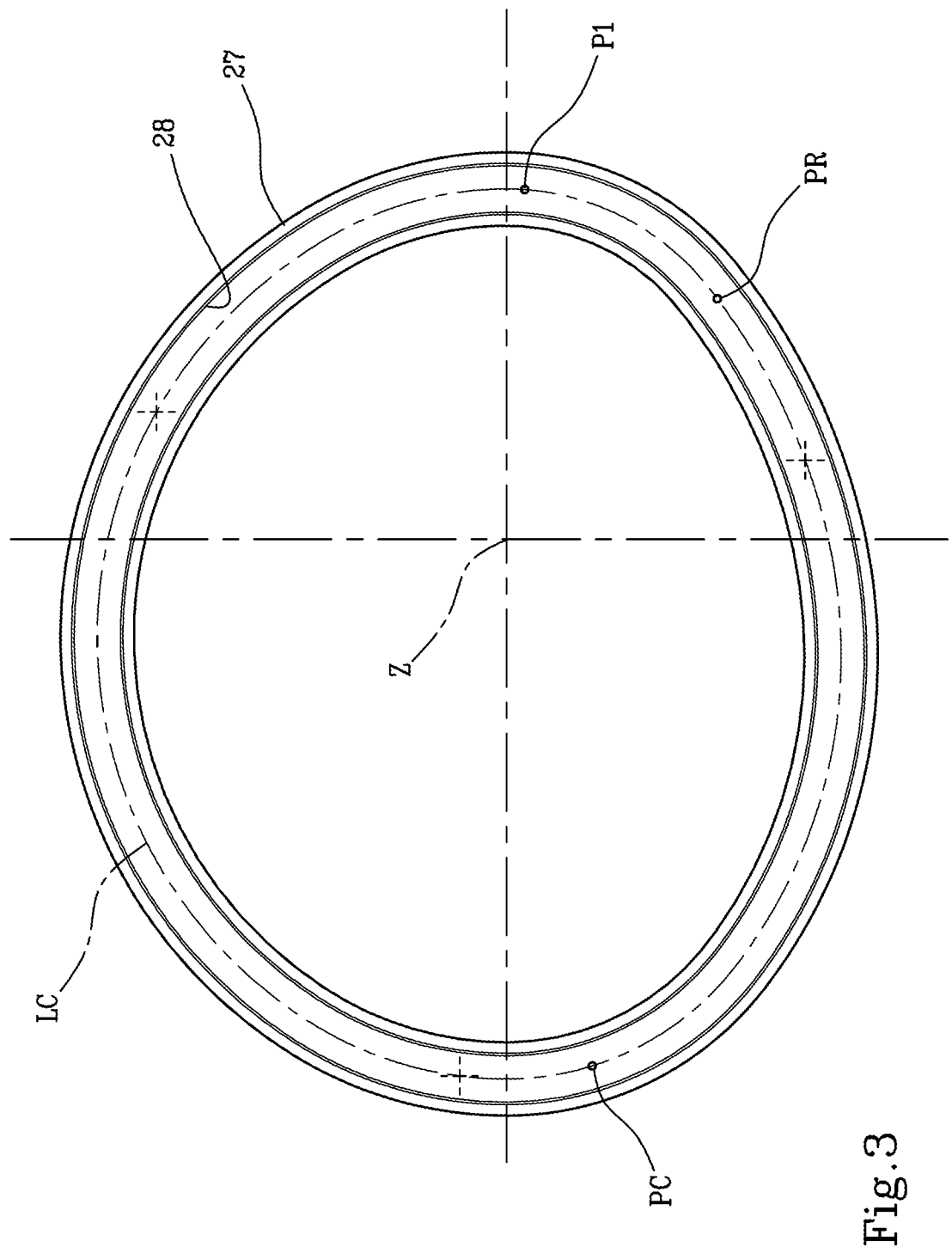
FIG. 3 is a plan view of a cam included in the removing device of FIG. 2.

The cam element 27 shown in FIG. 3 is not identical to the cam element 27 shown in FIG. 2. The two cam elements differ in terms of a slightly different shape of the central line LC, but operate according to the same principle.

The cam track 28 may be shaped like a groove. In the example shown, as shown in FIG. 4, the cam track 28 faces downwards, so as to face the removing elements 19.

The positioning device further comprises, for each removing element 19, a cam follower 29 arranged to engage with the cam track 28. Each cam follower 29 may be shaped like a roller, which may be freely rotatable about an axis parallel to the axis Z, and is suitable for being received in the cam track 28. Each cam follower 29 is mounted on a corresponding removing element 19 and may be provided, for example, on an upper surface of the removing element 19, that is to say, on a surface of the removing element 19 positioned on the opposite side relative to the supporting disc 17.

The removing elements 19 are supported by the supporting disc 17 in such a way as to be slidable relative to the supporting disc 17, so as to move towards, or alternatively move away from, the axis Z. In particular, the removing elements 19 may be slidable relative to the supporting disc 17 along respective radial directions. To allow the removing elements 19 to slide on the supporting disc 17, sliding guides 30 may be provided, the sliding guides 30 being for example shaped like grooves, in which corresponding protuberances of the removing elements 17 engage.

Each removing element 19 is movable along a closed path P, shown in FIG. 1. In particular, the path P is the path of a central point of the seat 23.

Each removing element 19 comprises a recessed zone 34, shown in FIGS. 4 to 7, arranged to house a portion of the projecting edge zone 5 when the object 2 is resting on the supporting surface 18. The recessed zone 34 is made on a surface of the removing element 19 facing the supporting disc 17 that is, in the example shown, on a lower surface of the removing element 19. The recessed zone 34 is delimited, transversally to the axis Z, by a stop surface 36, facing the supporting surface 18 of the supporting disc 17. The stop surface 36 may be a flat surface, for example positioned perpendicularly to the axis Z.

The guiding element 26 is delimited, in plan view, by an inner profile which may have an introduction stretch 38 along which the distance between the guiding element 26 and the axis Z progressively decreases. The introduction stretch 38 allows the object 2 to start interacting with the guiding element 26 in a gradual manner. Downstream of the introduction stretch 38, the inner profile of the guiding element 26 substantially copies the path P of the removing elements 19, relative to which it is offset by a substantially constant quantity.

An indentation 35 is provided on the guiding element 26, the indentation 35 being shaped for example like a step, arranged to receive a further portion of the projecting edge zone 5, diametrically opposite the portion of the projecting edge zone 5 which is received in the recessed zone 34. Also the indentation 35 is provided on a surface of the guiding element 26 facing towards the supporting disc 17, that is to say, on a lower surface of the guiding element 26.

The indentation 35 is delimited by an abutment surface 37, positioned transversally to the axis Z, and facing downwards, that is, towards the supporting disc 17. The abutment surface 37 may be flat and may be, for example, positioned perpendicularly to the axis Z:

During operation, the central body 16 and with it the supporting disc 17 are rotated continuously about the axis Z. The removing elements 19, supported by the supporting disc 17, are also rotated about the axis Z. The cam followers 29 associated with the removing elements 19 move along the cam track 28 of the cam element 27. As the cam followers 29 move along the cam track 28, the distance of each cam follower 29 from the axis Z is varied. Therefore, the removing elements 19, guided by the sliding guides 30, move, for example, in a radial direction relative to the supporting disc 17.

In this way, each removing element 19 moves along the closed path P, shown schematically in FIG. 1.

While the removing elements move along the closed path P, the moulds 9 move along the trajectory PS. When an object 2, compression moulded in a mould 9, has been cooled in the mould 9 to a temperature sufficient for the object 2 to be handled without damaging it, the mould 9 is brought to the position of maximum opening PA, by moving the male part 10 and the female part 11 relative to each other, in particular—in the example shown—by moving downwards the male part 10. It is now possible to extract the object 2 from the mould 9.

In the example shown, as shown in FIG. 4, after the mould 9 has been opened, the object 2 remains associated with the female part 11.

The female part 11 comprises an annular forming element 31, which extends about the moulding axis S and is suitable for shaping the outside of the lateral wall 3 of the object 2. The female part 11 further comprises an extracting element 32, delimited by a forming surface 33, suitable for forming externally the transversal wall 4 of the object 2. The extracting element 32 is movable along the moulding axis S between a forming position PF, shown in FIG. 4, and an extraction position, in which the extracting element 32 has brought the object 2 into contact with the supporting surface 18 for detaching the object 2 from the female part 11. In the forming position PF, the extracting element 32 operates in conjunction with the annular forming element 31 and the male part 10 to form the object 2. To pass from the forming position PF to the extraction position, the extracting element 32 is moved along the moulding axis S towards the male part 10. When this occurs, the extracting element 32 pushes on the transversal wall 4 of the object 2, thereby applying on the object 2 a force which allows the object 2 to be detached from the annular forming element 31.

When the mould 9 is in the position of maximum opening PA, a transport element 14 of the transport device 13 and a removing element 19 of the removing device 15 are inserted between the male part 10 and the female part 11. The removing element 19 is positioned at a level higher than the transport element 14. As shown in FIG. 4, the removing element 19 is, during this step, at a distance D1 from the guiding element 26, the distance D1 being greater than a maximum transversal dimension Dmax of the object 2. In particular, in the example shown the maximum transversal dimension Dmax is the outer diameter of the projecting edge zone 5. The distance D1 is, on the other hand, taken on a central plane of the removing element 19, that is to say, on a plane which passes through the centre of the seat 23.

The extracting element 32, to which the object 2 is anchored, now starts to move towards the male part 10 along the moulding axis S, for detaching the object 2 from the annular forming element 31. Simultaneously, the cam element 27 and the cam follower 29 move the removing element 19 towards the guiding element 26.

FIG. 5 shows an instant in which the extracting element 32 is moving towards the male part 10 and has already detached the object 2 from the annular forming element 31 to bring the object 2 to a position interposed between the removing element 19 and the guiding element 26. The object 2 is still anchored to the extracting element 32. The removing element 19 is now at a distance D2 from the guiding element 26. The distance D2, even though less than the distance D1, is still greater than the maximum transversal dimension Dmax of the object 2. For this reason, the extracting element 32 can make the object 2 pass between the removing element 19 and the guiding element 26 without the projecting edge zone 5 of the object 2 interfering with the removing element 19 and/or with the guiding element 26.

Figure 6:
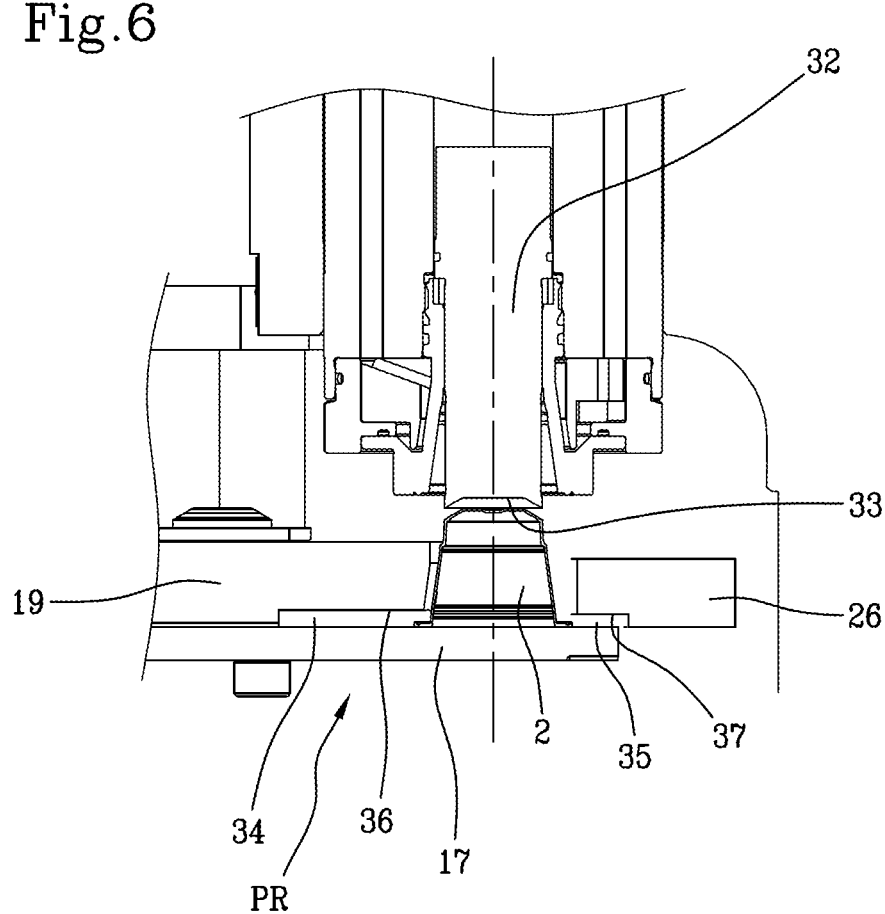
FIG. 6 is a view like that of FIG. 4, showing a narrower portion of the removing device, relating to a position subsequent to that of FIG. 5, in which the object is resting on the supporting surface.

The extracting element 32 continues its stroke towards the supporting surface 18, until the projecting edge zone 5 of the object 2 rests on the supporting surface 18. Simultaneously, as shown in FIG. 6, the removing element 19 is moved towards the object 2, so that the projecting edge zone 5 of the object 2 is, at least partly, received inside the recessed zone 34 of the removing element 19. The stop surface 36 of the removing element 19 is now positioned, at least partly, above the projecting edge zone 5 of the object 2.

During the rotation of the central body 16 about the axis Z, the positioning device moves the removing element 19 towards the object 2, so that the removing element 19 comes into contact with the lateral wall 3 of the object 2.

When the object 2 arrives close to the end of the introduction stretch 38 of the guiding element 26, a portion of the projecting edge zone 5 facing the guiding element 26 is received in the indentation 35.

Moreover, due to the shape of the guiding element 26, the lateral wall 3 of the object 2 comes into contact with the guiding element 26.

After positioning the object 2 on the supporting surface 18, the extracting element 32 returns backwards, that is to say, it moves along the moulding axis S towards the annular forming element 31. The removing element 19 and/or the guiding element 26 engage with the object 2 and retain the object 2 close to the supporting surface 18. The object 2 consequently detaches from the extracting element 32 and remains resting on the supporting disc 17. In particular, the stop surface 36 and/or the abutment surface 37 block the projecting edge zone 5 of the object 2, thereby preventing the object 2 from returning towards the annular forming element 31 together with the extracting element 32.

The object 2 is thus released onto the supporting surface 18.

Figure 7:
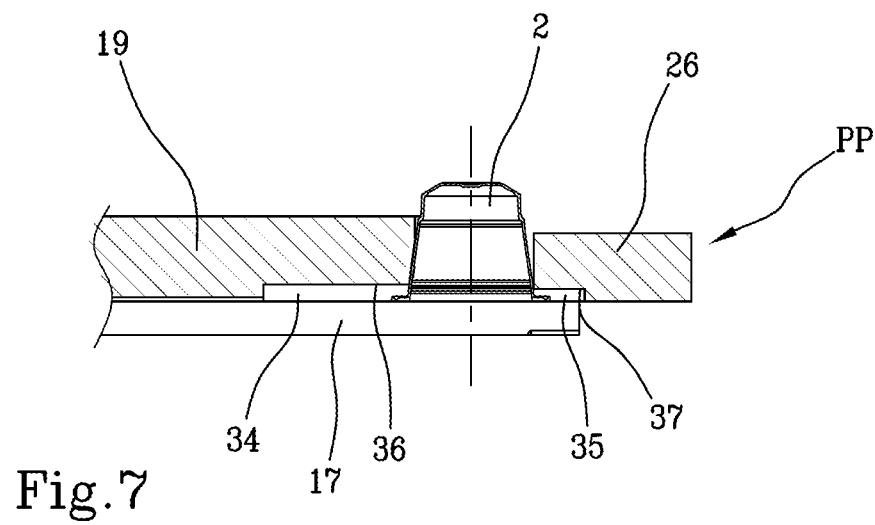
FIG. 7 is a simplified cross-section showing the object resting on the supporting surface at an instant after that of FIG. 6.

When the lateral wall 3 of the object 2 is in contact both with the removing element 19 and with the guiding element 26, a gripping position PP is reached, as shown in FIG. 7. In this configuration, in particular, the removing element 19 is in contact with a portion of the lateral wall 3 of the object 2, whilst the guiding element 26 is in contact with a further portion of the lateral wall 3 of the object 2, diametrically opposite the portion of the lateral wall 3 with which the removing element 19 is in contact.

The object 2 rests on the supporting surface 18 in an upside-down configuration, that is to say, with the projecting edge zone 5 facing downwards and the transversal wall 4 facing upwards. In this configuration, which is also that in which the object 2 is formed in the mould 9, a concavity of the object 2, delimited by the lateral wall 3 and by the transversal wall 4, faces the supporting surface 18.

Housing the projecting edge zone 5 in the recessed zone 34 ensures that the removing element 19 abuts against the lateral wall 3 of the object 2, and not against its projecting edge zone 5. The removing element 19 therefore uses the lateral wall 3 of the object 2 for conveying the object 2 towards the outfeed conveyor 20, which guarantees greater precision and reliability during transport of the object 2 by the removing element 19.

Furthermore, housing in the indentation 35 a portion of the projecting edge zone 5 opposite the removing element 19 ensures that, downstream of the gripping position PP, the guiding element 26 interacts with the object 2 at the lateral wall 3 of the latter. This makes it possible to further improve precision and reliability in conveying the object 2 by the removing element 19 operating in conjunction with the guiding element 26.

By housing the projecting edge zone 5 in the recessed zone 34, the object 2 may be retained close to the supporting surface 18 to allow detachment of the object 2 from the extracting element 32. This is facilitated by the interaction between the projecting edge zone 5 and the stop surface 36. Even the guiding element 26 may, in certain situations, help detachment of the object 2 from the extracting element 32, owing to the interaction between the projecting edge zone 5 and the abutment surface 37.

FIG. 3 shows, along the central line LC of the cam track 28, some significant points reached by the removing elements 19 along their path. In particular, PR denotes a receiving position, in which the object 5 is received between a removing element 19 and the guiding element 26 and rests on the supporting surface 18. Subsequently, as described above, the cam element 27, operating in conjunction with the cam follower 29, moves the removing element 19 towards the object 2, thereby bringing the removing element 19 into contact with the lateral wall 3 of the object 2. This occurs in a contact position P1, which is indicated in FIG. 3.

It should be noted that, while passing from the receiving position PR to the contact position P1, the distance between the points of the central line LC of the cam track 28 and the axis Z progressively increases, which means that the removing element 19 is moved outwards, that is to say, moved progressively away from the axis Z.

While the object 2 is moved along the path P, due to the shape of the guiding element 26, the lateral wall 3 comes into contact with the guiding element 26. This occurs in the gripping position PP, shown in FIG. 7.

Downstream of the gripping position PP, the removing element 9 continues to move the object 2, which is now also in contact with the guiding element 26, towards the outfeed conveyor 20. Whilst this occurs, the object 2 moves initially along a portion of path which may be substantially circular. Subsequently, the cam element 27, by operating in conjunction with the cam follower 29, further moves the removing element 19 away from the axis Z, for example in a radial direction. The object 2 is thus progressively moved towards the periphery of the supporting disc 17 and subsequently, as shown in FIG. 2, passes from the supporting disc 17 to the intermediate support 21, which may be at the same height as the supporting disc 17.

The removing element 19 is further made to slide towards the outside of the supporting disc 17, until positioning the object 2 on the outfeed conveyor 20, in such a way that the object 2 is positioned along the outfeed axis U of the outfeed conveyor 20. This occurs in a delivery position PC, shown in FIGS. 2 and 3, in which the object 2 is delivered to the outfeed conveyor 20.

The removing element 19, after having delivered the object 2 to the outfeed conveyor 20, is moved towards the axis Z by the cam element 27 operating in conjunction with the cam follower 29, until again reaching the receiving position PR, in which the removing element 19 receives a new object 2.

Although reference has always been made, in the example described above, to objects 2 having a projecting edge zone 5, the method and the apparatus described above can also be usefully used for moving away from the moulds 9 objects having a frustoconical wall or more generally a wall which narrows from the supporting surface 18 upwards, when the object 2 is resting on the supporting disc 17. In this case, receiving the object 2 on the supporting surface 18 whilst the removing element 19 is in a retracted position and there is therefore a clearance between the removing element 19 and the object, helps to avoid interference between the lateral wall 3 of the object 2 and the removing element 19.

In an alternative embodiment which is not shown, the removing device 15 may comprise a suction system associated with the supporting disc 17 for holding the objects 2 in contact with the supporting surface 18 while the objects 2 are moved towards the outfeed conveyor 20 by the removing device 15. The suction system may comprise a suction source connected to a plurality of suction holes opening on the supporting surface 18 through a conduit arrangement.

The suction system may be of the kind disclosed in the international patent application no. WO 2004/096515.

The suction system allows to improve stability of the objects 2 as the objects 2 are conveyed, while limiting the risks that the objects 2 may tilt or be arranged in an incorrect position.

Figure 9:
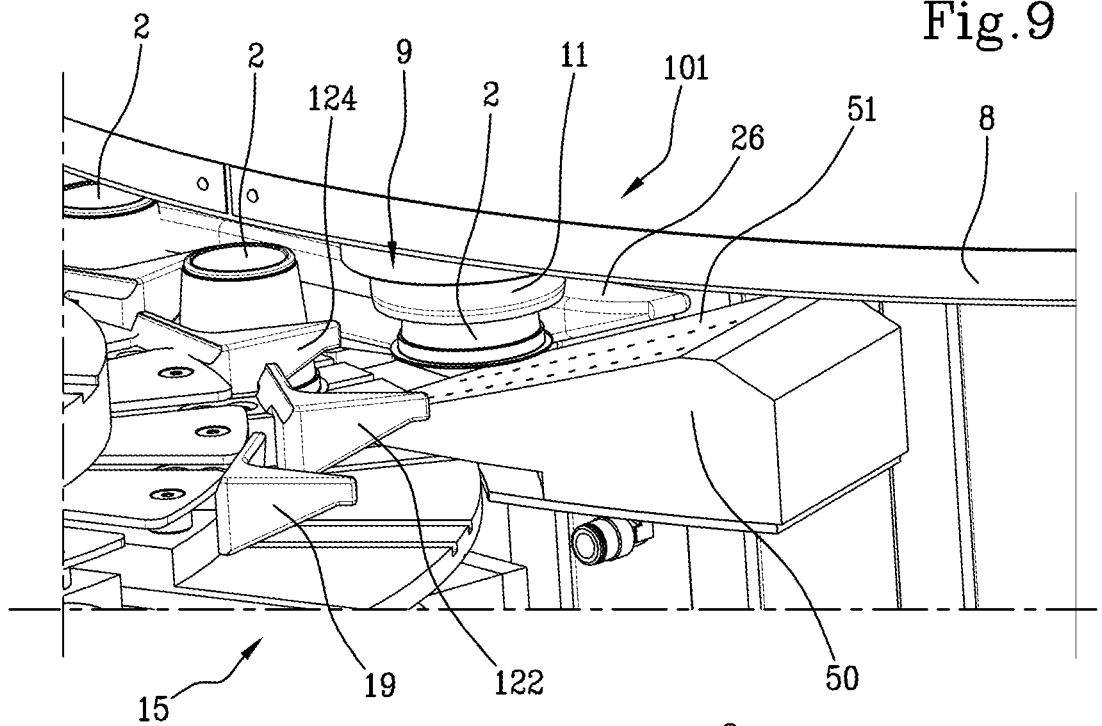
FIG. 9 is an interrupted perspective view showing a portion of an apparatus for producing objects by compression moulding according to an alternative embodiment.
Figure 10:
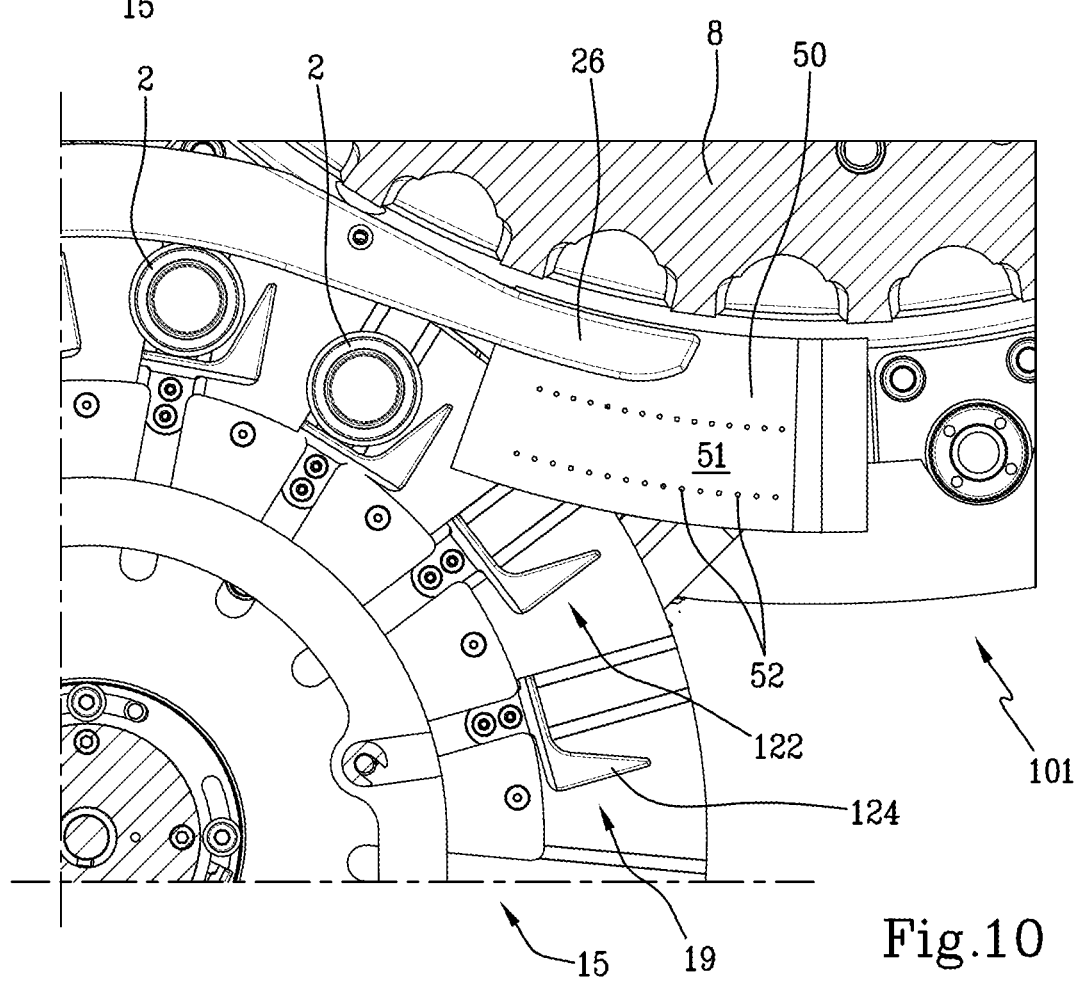
FIG. 10 is a partially sectioned view, taken from above, of the portion of apparatus shown in FIG. 9.

FIGS. 9 and 10 show a portion of an apparatus 101 for producing objects by compression moulding according to an alternative embodiment.

The apparatus 101 differs from the apparatus 1 which was previously disclosed mainly because it comprises a chute 50 interposed between the moulding carousel 8 and the removing device 15, the chute 50 being intended to direct each object 2 from a mould 9 towards a corresponding removing element 19.

The chute 50 is suitable for restingly receiving the objects 2 when each object 2 is detached from the female part 11 of the mould 9 in which the object 2 was produced. The chute 50 is delimited by an upper surface 51, which may be flat, and which is tilted relative to a horizontal direction.

A pneumatic device may be associated with the chute 50 for supplying compressed air through a plurality of holes 52 provided on the upper surface 51. In the example shown, two rows of holes 52 are provided and the holes 52 of each row are arranged along a respective circumference, the centre of which may be on the axis A of the moulding carousel 8. However, this condition is not necessary and other distributions of the holes 52 are possible.

The pneumatic device is intended to generate an air cushion on the upper surface 51 of the chute 50, so as to reduce friction between the objects 2 and the upper surface 51. The objects 2 may thus slide easily along the upper surface 51.

Each mould 9 may comprise an extracting element which is not shown, similar to the extracting element 32 which was previously described, having the function of detaching the object 2 from the female part 11 and accompanying the object 2 towards the removing device 15.

However, in the embodiment of FIGS. 9 and 10 the object 2 which is extracted from the mould 9 is positioned on the chute 50, instead of being released directly from the mould 9 to the supporting surface 18, as occurred in the embodiment shown in FIGS. 1 to 8. From the chute 50, the object 2 descends on the supporting disc 17, owing to the action of the gravity force and supported by the air cushion, if present. The object 2 is therefore released on the supporting surface 18 with the assistance of the chute 50 through which the object 2 passes from the mould 9 to the supporting disc 17.

When the object 2 has reached the supporting disc 17, a removing element 19 engages with the object 2 and conveys the latter towards the delivery position PC, as described above with reference to FIGS. 1 to 8.

The removing elements 19 of the embodiment of FIGS. 9 and 10 have a shape which is slightly different from what was disclosed with reference to FIGS. 1 to 8. More specifically, the removing elements 19 shown in FIGS. 9 and 10 have a conveying portion 122 which, instead of having a "C" shape, has a "L" shape.

That is to say, each conveying portion 122 has a single lateral protrusion 124, suitable for being positioned behind the object 2 relative to a movement direction of the object 2 by the removing device 15, so that the lateral protrusion 124 of each removing element 19 can push the object 2 towards the delivery position PC.

The "L" shape of the conveying portions 122 shown in FIGS. 9 and 10 can be used even in the removing elements 19 of the apparatus 1 shown in FIGS. 1 to 8.

The chute 50 allows to better control the object 2 as the latter passes from the moulding carousel 8 to the removing device 15, thereby preventing the object 2 from falling along significant vertical distances.

The invention claimed is:

1. A method for conveying a concave object having a lateral wall away from a mould, the method comprising the steps of:
    providing a removing element, movable along a path, and a guiding element;
    extracting the object from the mould and releasing the object onto a supporting surface in a position interposed between the removing element and the guiding element, while the removing element is at a distance from the object;
    displacing the removing element towards the object, so that the removing element makes contact with the lateral wall;
    moving the removing element along a portion of said path, to convey the object towards a delivery position, wherein the object comprises a projecting edge zone which projects outward from one end of the lateral wall and wherein, during the step of displacing the removing element towards the object, a portion of the projecting edge zone is received in a recessed zone provided in the removing element.

2. A method according to claim 1, wherein, during the step of extracting the object from the mould, an extracting element brings the object into contact with the supporting surface by making the object pass between the removing element and the guiding element.

3. A method according to claim 2, wherein the removing element retains the object while the extracting element moves away from the supporting surface.

4. A method according to claim 2, wherein the extracting element has a forming surface which externally forms a transversal wall of the object.

5. A method according to claim 1, wherein the step of extracting the object from the mould comprises positioning the object on a chute which releases the object on the supporting surface.

6. A method according to claim 1, wherein the lateral wall of the object makes contact with the guiding element, which interacts with a region of the lateral wall opposite to a further region of the lateral wall which interacts with the removing element, so as to keep the object guided.

7. A method according to claim 6, wherein a part of the projecting edge zone is received in an indentation provided in the guiding element.

8. A method according to claim 1, wherein, during the step of moving the removing element, the removing element is moved outward, so as to position the object on an outfeed conveyor, in the delivery position.

9. A method according to claim 1, wherein the object is formed in an upside-down configuration, so that, during the extracting step, a concavity of the object is facing the supporting surface.

10. An apparatus comprising:
at least one mould for forming an object;
at least one removing element, movable along a path, for moving the object away from the mould;
a guiding element, suitable for operating in conjunction with the removing element for guiding the object while the object is moved away from the mould;
a positioning device for positioning the removing element at a distance from the guiding element which is variable along said path, the positioning device being so configured that the removing element is at a distance from the object, when the object is received between the removing element and the guiding element, the positioning device being further configured to move the removing element towards the guiding element, until the removing element makes contact with a lateral wall of the object,
wherein the removing element has a recessed zone for housing a part of a projecting edge zone which projects outward from the lateral wall of the object, the recessed zone facing a supporting surface suitable for supporting the object while the object is moved by the removing element.

11. An apparatus according to claim 10, and further comprising an extracting element for extracting the object from the mould.

12. An apparatus according to claim 11, wherein the extracting element is configured to release the object onto the supporting surface in a position interposed between the removing element and the guiding element.

13. An apparatus according to claim 11, wherein the extracting element has a forming surface for externally forming a transversal wall of the object.

14. An apparatus according to claim 10, and further comprising a chute for receiving the object from the mould and releasing the object onto the supporting surface.

15. An apparatus according to claim 10, wherein the guiding element has an indentation for housing a further part of the projecting edge zone, the indentation facing towards the supporting surface.

16. An apparatus according to claim 10, wherein the mould comprises a male mould part and a female mould part, the female mould part being positioned above the male mould part.

17. An apparatus according to claim 10, wherein the positioning device comprises a cam element arranged in a fixed position and a cam follower mounted on the removing element for engaging with the cam element.

18. A method for conveying a concave object having a lateral wall away from a mould, the method comprising the steps of:
providing a removing element, movable along a path, and a guiding element;
extracting the object from the mould and releasing the object onto a supporting surface in a position interposed between the removing element and the guiding element, while the removing element is at a distance from the object;
displacing the removing element towards the object, so that the removing element makes contact with the lateral wall;
moving the removing element along a portion of said path, to convey the object towards a delivery position, wherein the lateral wall of the object makes contact with the guiding element, which interacts with a region of the lateral wall opposite to a further region of the lateral wall which interacts with the removing element, so as to keep the object guided, and wherein the object comprises a projecting edge zone which projects outward from one end of the lateral wall, a part of the projecting edge zone being received in an indentation provided in the guiding element.

19. A method for conveying a concave object having a lateral wall away from a mould, the method comprising the steps of:
providing a removing element, movable along a path, and a guiding element;
extracting the object from the mould and releasing the object onto a supporting surface in a position interposed between the removing element and the guiding element, while the removing element is at a distance from the object;
displacing the removing element towards the object, so that the removing element makes contact with the lateral wall;
moving the removing element along a portion of said path, to convey the object towards a delivery position, wherein the object is formed in an upside-down configuration, so that, during the extracting step, a concavity of the object is facing the supporting surface.

20. An apparatus comprising:
at least one mould for forming an object;
at least one removing element, movable along a path, for moving the object away from the mould;
a guiding element, suitable for operating in conjunction with the removing element for guiding the object while the object is moved away from the mould;
a positioning device for positioning the removing element at a distance from the guiding element which is variable along said path, the positioning device being so configured that the removing element is at a distance from the object, when the object is received between the removing element and the guiding element, the positioning device being further configured to move the removing element towards the guiding element, until the removing element makes contact with a lateral wall of the object,
wherein the mould comprises a male mould part and a female mould part, the female mould part being positioned above the male mould part.

* * * * *